UNITED STATES PATENT

[19] Kampman

[11] Patent Number: 4,561,594
[45] Date of Patent: Dec. 31, 1985

[54] END CLEANER FOR FLAIL TYPE MANURE SPREADER

[75] Inventor: Lester R. Kampman, Vinton, Iowa

[73] Assignee: Highway Equipment Company, Cedar Rapids, Iowa

[21] Appl. No.: 603,644

[22] Filed: Apr. 25, 1984

[51] Int. Cl.[4] ............................................. A01C 3/06
[52] U.S. Cl. .................................... 239/658; 366/607
[58] Field of Search .............. 239/658, 662; 172/45; 56/29; 366/66, 194–196, 279, 297, 607

[56] References Cited

U.S. PATENT DOCUMENTS

| 3,195,899 | 7/1965 | Neuenschwander | 172/45 |
| 3,414,199 | 12/1968 | Ferris | 239/658 |
| 3,790,090 | 2/1974 | Lorenc et al. | 239/666 |
| 3,980,239 | 9/1976 | Lee | 239/658 |

Primary Examiner—Jeffrey V. Nase
Assistant Examiner—James R. Moon, Jr.

[57] ABSTRACT

A flail type manure spreader apparatus having a half round, elongated tank having a rotor to which flail chains are anchored for 360° rotation, a pair of starters secured to each end of the rotor, and cleanout flingers having depending chains thereon to make certain the areas about the lower end of the tank adjacent the ends are cleaned of manure while spreading.

1 Claim, 4 Drawing Figures

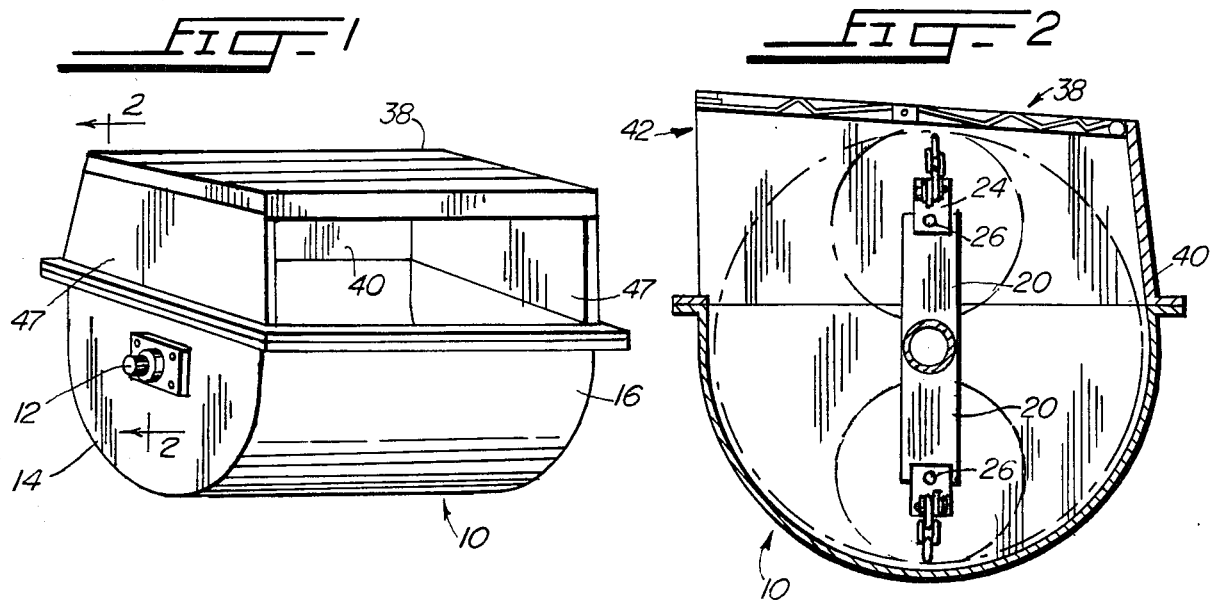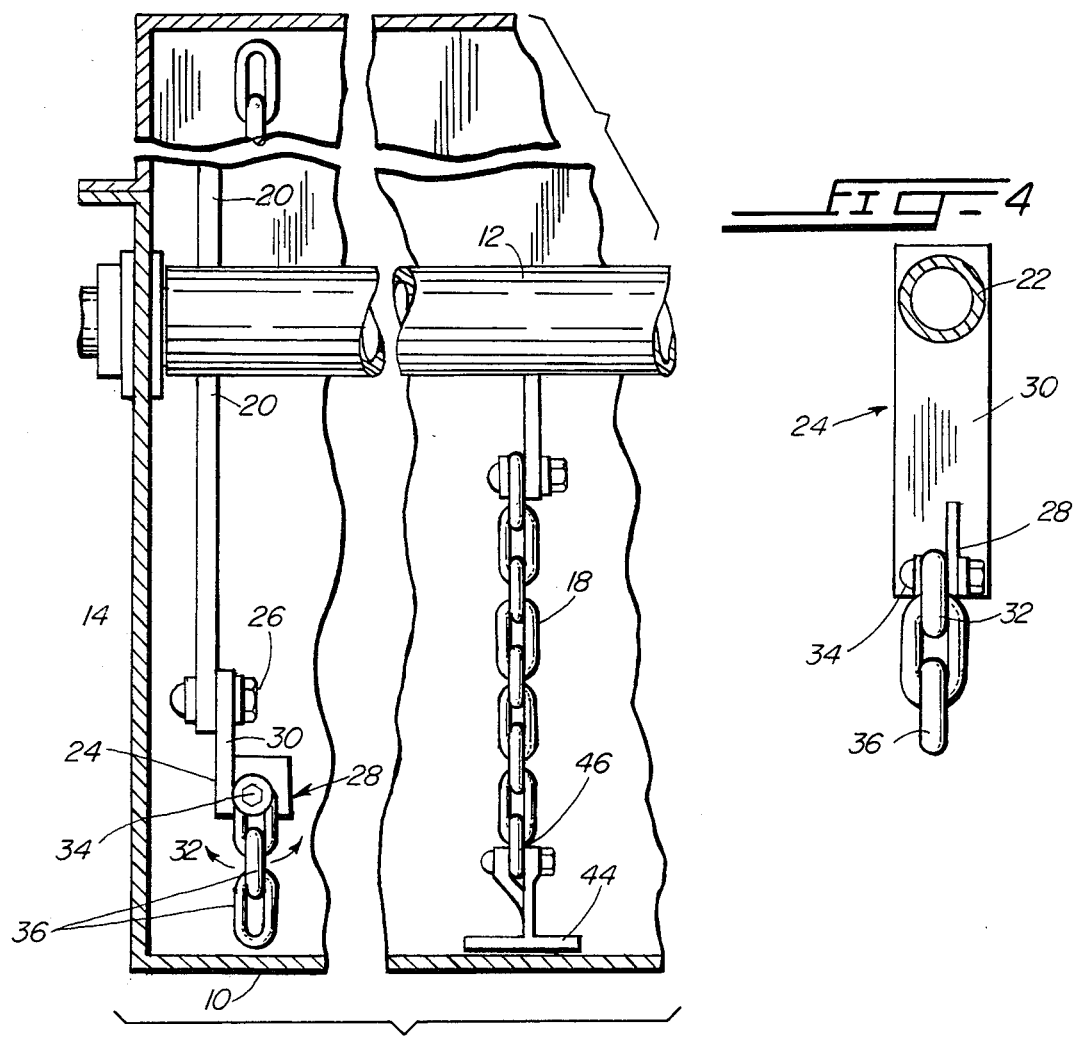

END CLEANER FOR FLAIL TYPE MANURE SPREADER

BACKGROUND OF THE INVENTION

Flail manure spreaders generally are constructed of half round metal tanks of various lengths having a series of flail chains attached to a rotor and starters with short flingers pivotally secured at both ends of the rotor and positioned adjacent the end walls of the tank. Presently, starters and flingers do not reach the bottom of the tank thereby creating a buildup of manure at these end and bottom walls. This causes serious problems whether the manure is frozen or not because the rotor rotated by means of sprockets and chains is connected to the tractor power takeoff. Dead heading of the starters and flingers occurs causing damage to the spreader and tractor drive line. This happens when starter and flinger are too short, or too long, and not flexible so they can rotate the required 360°. It was to overcome this deficiency that the present invention was conceived.

SUMMARY OF THE INVENTION

Means on the lower ends of the flingers pivotally secured to the lower ends of the starters of the manure spreader of the flail chain type for making certain that the bottom and side walls remain free of a buildup of manure at all times.

BRIEF DESCRIPTION OF THE DRAWINGS

FIG. 1 is a perspective view of a flail manure spreader;

FIG. 2 is a vertical cross-sectional view of FIG. 1;

FIG. 3 is a cross-sectional view taken on the line 3—3 of FIG. 2; and

FIG. 4 is an enlarged side view of the flinger and chain.

DETAILED DESCRIPTION OF THE DRAWINGS

A half round tank 10 of any predetermined length is constructed of metal and comprises a rotor 12 journaled by bearings at each end wall 14, 16 adjacent the upper ends thereof. The means for rotating the rotor comprises sprockets and chains which are driven by the power takeoff of a tractor, which structure is not shown as it is well known in the art.

A series of flail chains 18 are spaced about 4½ inches apart but the chain flails adjacent the end walls 14, 16 are about 7½ inches therefrom.

An elongated plate 20 is positioned in pairs adjacent each end of the rotor 12 and welded thereto. This plate is called a starter in the trade and rotates 360° with the rotary action of the rotor 12. Since both starters are the same only one will be referred to.

Another elongated plate 24, of less width than the starter, is provided with an aperture to be pivotally secured to the free end of the starter plate 20 by pivot bolts 26. This plate is called a flinger and rotates 360° with the rotary action of the rotor and can independently rotate 360°.

One side edge of a small plate 28 is welded one to each of the inner faces 30 of the flinger 24 and extends at right angles thereto inwardly towards the interior of the tank 10.

The plate 28 is provided with an aperture and the upper link 32 of a chain is secured to the plate by bolting as at 34 through the aperture in plate 28. Depending upon the depth of the tank 10, the chain links 36 may be of two to seven links; just so the links are long enough to almost touch the bottom of the tank and provide a clearance. The chain links (36) must also be able to move 90° rearward and forward as shown in FIG. 3 by the two arrows.

As the rotor 12 revolves, the starters 20 rotate 360° while the flingers 24 also rotate 360°. The flinger must also be able to rotate 360° about the pivot 26, as seen in broken lines in FIG. 2, thus removing all of the manure adjacent the bottom and adjacent the end walls of the tank 10 and flinging the same in the path of the chain flails 18.

The tank 10 is provided with a cover or lid 38 which extends above the tank and having three closed sides consisting of two end walls 47 and one side wall as at 40 while the opposed side is open as at 42 for filling the tank and allowing the flail chains to exhaust the contents in the tank therethrough when in operation.

The lid 38 and side wall 40 are so designed that a clear path is had for the flail chains 18 to urge and throw the manure out of the open side 42 onto the ground for fertilizing purposes.

As seen in FIG. 2, the open side 42 of the cover has a larger opening than the closed side 40.

The ends of the flail chains may be each provided with a hammer 44 which is bolted to the lowest link as at 46.

It should be apparent that if desired, a hammer 44 may be used on the last link extending from the flinger 24 just making sure that the bottom of the hammer is not touching the wall of the tank. There must be clearance from the wall and bottom of the tank for all the chain links used with or without a hammer.

Although but one specific embodiment of this invention is herein shown and described, it will be understood that details of the construction shown may be altered or omitted without departing from the spirit of the invention as defined by the following claims.

I claim:

1. A flail type manure spreader comprising a half round elongated tank having end walls, a rotor extending the length of said tank and journaled in said end walls, a series of flail chains mounted on said rotor in longitudinally spaced relation, a pair of elongated starter plates fixed to said rotor adjacent said end walls and flanking said flail chains, and elongated flinger plate pivotally secured to a free end of each said starter plate, each flinger plate being provided with an inner face, a small plate anchored to said inner face at right angles thereto, and chain means mounted on said small plate whereby said flinger plates are adapted to rotate 360° above the pivotal mounting thereof on said starter plates and in a plane perpendicular to the rotor length while said chain means is adapted to swing in an arc parallel to the length of said rotor and thereby move material into the path of the flail chains.

* * * * *